United States Patent
Li et al.

(10) Patent No.: US 11,986,814 B2
(45) Date of Patent: May 21, 2024

(54) PREPARATION METHOD OF EMBEDDED ALKALINE EARTH METAL OXIDE SOLID ALKALI AND APPLICATION THEREOF IN BIODIESEL PRODUCTION

(71) Applicants: SHANDONG JIANZHU UNIVERSITY, Shandong (CN); SHANDONG UNIVERSITY, Shandong (CN)

(72) Inventors: Hui Li, Shandong (CN); Xiaoling Ma, Shandong (CN); Yongbo Wang, Shandong (CN); Ping Cui, Shandong (CN); Guoning Li, Shandong (CN); Min Guo, Shandong (CN); Shoujun Zhou, Shandong (CN); Wanpeng Lu, Shandong (CN); Mingzhi Yu, Shandong (CN)

(73) Assignees: SHANDONG JIANZHU UNIVERSITY, Jinan (CN); SHANDONG UNIVERSITY, Jinan (CN)

(*) Notice: Subject to any disclaimer, the term of this patent is extended or adjusted under 35 U.S.C. 154(b) by 52 days.

(21) Appl. No.: 17/834,476

(22) Filed: Jun. 7, 2022

(65) Prior Publication Data
US 2022/0297107 A1  Sep. 22, 2022

Related U.S. Application Data

(63) Continuation of application No. PCT/CN2022/072450, filed on Jan. 18, 2022.

(30) Foreign Application Priority Data

Mar. 16, 2021 (CN) .......................... 202110280039.3

(51) Int. Cl.
  *B01J 37/08* (2006.01)
  *B01J 23/00* (2006.01)
  (Continued)

(52) U.S. Cl.
  CPC ............ *B01J 37/086* (2013.01); *B01J 23/002* (2013.01); *B01J 23/02* (2013.01); *C10L 1/02* (2013.01); *C11C 3/10* (2013.01)

(58) Field of Classification Search
  CPC ........ B01J 37/086; B01J 23/002; B01J 23/02; B01J 31/2239; B01J 2231/49;
  (Continued)

(56) References Cited

U.S. PATENT DOCUMENTS

2009/0305040 A1* 12/2009 Schubert ............ B01J 20/28042
                                                 423/625
2017/0279109 A1* 9/2017 Wang ..................... H01M 4/525

FOREIGN PATENT DOCUMENTS

CN    101012389 A    8/2007
CN    101380570 A    3/2009
(Continued)

OTHER PUBLICATIONS

Tanumoy Dhawa et al., In Situ Mg/MgO-Embedded Mesoporous Carbon Derived from Magnesium 1,4-Benzenedicarboxylate Metal Organic Framework as Sustainable LI-S Battery Cathode Support, ACS Omega, vol. 2, pp. 6481-6491 (Oct. 6, 2017).
(Continued)

*Primary Examiner* — Cephia D Toomer
(74) *Attorney, Agent, or Firm* — SZDC Law PC

(57) ABSTRACT

A method for synthesizing and application embedded alkaline earth metal oxide solid alkali includes: firstly, synthesizing an alkaline earth metal organic skeleton with single or multiple alkaline earth metals (Mg, Ca and Sr) as central metal elements; and then controlling the heating process to
(Continued)

carry out high-temperature pyrolysis in a non-oxidizing atmosphere, so that the alkaline earth metal oxide are embedded in the nano carbon sheet to obtain a solid alkali catalyst. Finally, the catalyst is used to catalyze the trans-esterification of palm oil and methanol to produce biodiesel. The active site of the solid alkali obtained by the method is anchored on the nano-like carbon sheet, so that the active site is directly exposed on the surface of the catalyst, the catalytic activity is improved, the loss of the active site is inhibited, and the stability of the solid alkali catalyst is enhanced.

5 Claims, 2 Drawing Sheets

(51) Int. Cl.
*B01J 23/02* (2006.01)
*C10L 1/02* (2006.01)
*C11C 3/10* (2006.01)

(58) Field of Classification Search
CPC ............ B01J 2531/0216; B01J 2531/23; B01J 21/18; B01J 37/033; B01J 37/04; B01J 31/1691; C10L 1/02; C11C 3/10; C11C 3/003
See application file for complete search history.

(56) References Cited

FOREIGN PATENT DOCUMENTS

| | | |
|---|---|---|
| CN | 104370820 A | 2/2015 |
| CN | 104785298 A | 7/2015 |
| CN | 104841488 A | 8/2015 |
| CN | 110052293 A | 7/2019 |
| CN | 111769294 A | 10/2020 |
| CN | 113019352 A | 6/2021 |
| WO | 8502176 A1 | 5/1985 |
| WO | 2017210874 A1 | 12/2017 |

OTHER PUBLICATIONS

P. Valvekens et al., Base catalytic activity of alkaline earth MOFS: a(micro)spectroscopic study of active site formation by the controlled transformation of structural anions, Chemical Science, vol. 5, p. 1 and Experimental and theoretical procedures (Jul. 25, 2014).
Li Zhu et al. "Metal-Organic Frameworks for Heterogeneous Basic Catalysis" Chemical Review, vol. 117, No. 12, pp. 8130-9133 (Jun. 28, 2017).

* cited by examiner

PREPARATION METHOD OF EMBEDDED ALKALINE EARTH METAL OXIDE SOLID ALKALI AND APPLICATION THEREOF IN BIODIESEL PRODUCTION

This application is a Continuation Application of PCT/CN2022/072450, filed on Jan. 18, 2022, which claims priority to Chinese Patent Application No. 202110280039.3, filed on Mar. 16, 2021, which is incorporated by reference for all purposes as if fully set forth herein.

TECHNICAL FIELD

The invention relates to that technical field of solid alkali catalysis technology and biodiesel. In particular to a solid alkali preparation process using an alkaline earth metal organic framework material as a precursor and application thereof in producing biodiesel by catalytic ester exchange.

BACKGROUND

Biodiesel has the advantages of extensive raw materials, renewable, low pollution emissions, full combustion and so on. Its main component is fatty acid monoester, which is produce by interesterification reaction of long chain grease and short chain alcohol (methanol or ethanol) such as vegetable oil, animal oil and waste grease through catalyst (Eq. (1)). Although the homogeneous alkali (NaOH, KOH, $CH_3ONa$) has high catalytic activity in industrial production, it is difficult to separate after use, and a large amount of wastewater is generated in the subsequent treatment process.

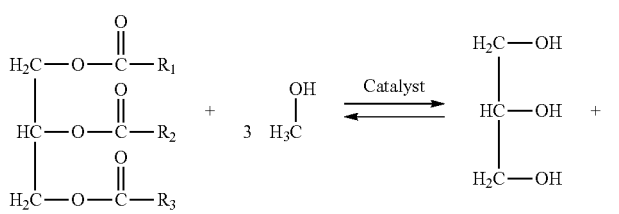
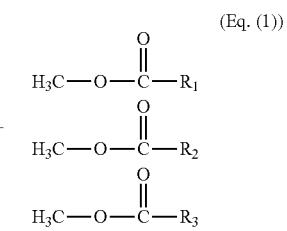
(Eq. (1))

In the prior art, the solid alkali catalyst mainly comprises alkaline earth metal oxides, transition metal oxides, composite oxides, supported oxides and so on. Among them, the alkaline earth metal oxide has the advantages of simple preparation, wide raw material source, good catalytic activity. However, common alkaline earth metal oxides have some problems such as small specific surface area (<5 $m^2/g$) and unsatisfactory pore structure, which not only reduces the activity of the catalyst, but also shortens the service life of the catalyst due to the deposition of reaction products and the loss of active sites, which severely limits its application in the production of biodiesel by catalytic transesterification.

Using porous materials with high specific surface area as carriers can improve the pore structure and increase the specific surface area of catalysts. Farooq et al. (Chem. Eng. Res. Des. 132 (2018) 644-651) increased the specific surface area of CaO from 1.34 $m^2/g$ to 66.7 $m^2/g$ through hydration treatment. Chen et al. (Fuel 153 (2015) 48-55) prepared $CaO—SiO_2$ catalyst, and the specific surface area was 15.47 $m^2/g$. Kesserwan et al. (Chem. Eng. J. 382 (2020) 123834) used $Al_2O_3$ as carrier to support CaO, and the specific surface area of the catalyst reached 44 $m^2/g$. Margellou et al. (Ind. Crops. Prod. 114 (2018) 146-153) increased the specific surface area of MgO from 3 $m^2/g$ to 26 $m^2/g$ by adding polyvinyl alcohol to $Mg(NO_3)_2$. It can be found that this kind of method can improve the pore structure, but the supported alkaline earth metal oxide will occupy the vacancy of the carrier, thus sacrificing the original pore structure of the carrier, resulting in the limited increase of the specific surface area of the catalyst. More importantly, the uneven distribution of catalyst active sites affects the catalytic activity.

The inventor's previous research CN110052293A adopts a "two-step process" to prepare a solid alkali catalyst. With MIL-100(Fe) as carrier, KF was first loaded by impregnation method, and then activated and calcined at high temperature to prepare magnetic solid alkali catalyst. The catalyst prepared by this method has the advantages of good catalytic activity and strong magnetism. However, the pore structure of the catalyst is still not ideal, the catalytic stability needs to be improved, and the preparation process of this method needs to be further simplified.

Therefore, it is imperative to develop solid alkali catalysts with rich pore structure, large specific surface area and high stability.

SUMMARY OF THE DISCLOSURE

To overcome the above shortcomings and solve the problem, a preparation process of an embedded alkaline earth metal oxide solid alkali and used it preparing biodiesel by interesterification were provided in this invention.

To achieve the technical purpose, the invention adopts the following technical scheme:

The first aspect of the present invention provide a method of preparing an embedded alkaline earth metal oxide solid alkali, which comprises: Synthesize an alkaline earth metal organic skeleton by taking single or multiple alkaline earth metal as central metal elements; The alkaline earth metal organic framework is pyrolyze at a high temperature in a non-oxidizing atmosphere to form an embedded alkaline earth metal oxide solid alkali.

The research of that invention found that at present, in the preparation process of the solid alkali catalyst. The specific surface area of the catalyst can be increased and the uniform distribution of active sites can be achieved by loading the active substance-calcining the catalyst (two-step method) by virtue of the ultra-high specific surface area of metal-organic frameworks (MOFs) and the ordered pore structure. However, the inventor's research found that the above method was cumbersome (requiring a separate alkali metal loading step), the specific surface area of the catalyst was limited, and the stability of the catalyst was also affected to some extent. Therefore, the research of the present invention found that for alkaline-earth metals, if the alkaline-earth metal is directly used as the central metal to synthesize the metal-organic framework. After pyrolysis at high temperature, the active sites of the solid alkali can be anchored on the nano-carbon sheet and forming an embedded nano-sheet structure, which can improve the specific surface area and catalytic stability of the solid base catalyst.

The method belongs to that one-step method for synthesizing solid alkali, can generate active site without externally loading active substances, and has the advantages of simple preparation method, convenient operation and strong practicability.

The second aspect of the present invention provide an embedded alkaline earth metal oxide solid alkali prepared by any of the above methods, which comprises: The active site of the solid alkali obtained anchored on the nano-like carbon sheet, which not only directly exposes the active site on the surface of the catalyst, but also improves the catalytic activity, inhibits the loss of the active site and strengthens the stability of the solid alkali catalyst.

The third aspect of the present invention provide the use of an embedded alkaline earth oxide solid alkali as described above for catalyzing the transesterification reaction of a feedstock oil with methanol to produce biodiesel.

The embedded alkaline earth metal oxide solid alkali of the invention can not only reduce the production cost of enterprises, but also help to alleviate environmental pollution, so it is expected to be widely used in this field.

The invention has the advantages that:

(1) The active site of the solid alkali obtained anchored on the nano-like carbon sheet, which not only directly exposes the active site on the surface of the catalyst, but also improves the catalytic activity, inhibits the loss of the active site and strengthens the stability of the solid alkali catalyst. From the perspective of biodiesel production technology, it can reduce the production cost of enterprises, and help to alleviate environmental pollution, having a great prospect of industrial application.

(2) The preparation method of the invention belongs to the one-step method, and has the advantages of simple method, convenient operation, strong practicability and easy popularization.

DETAILED DESCRIPTION OF THE EMBODIMENTS

Figure 1:
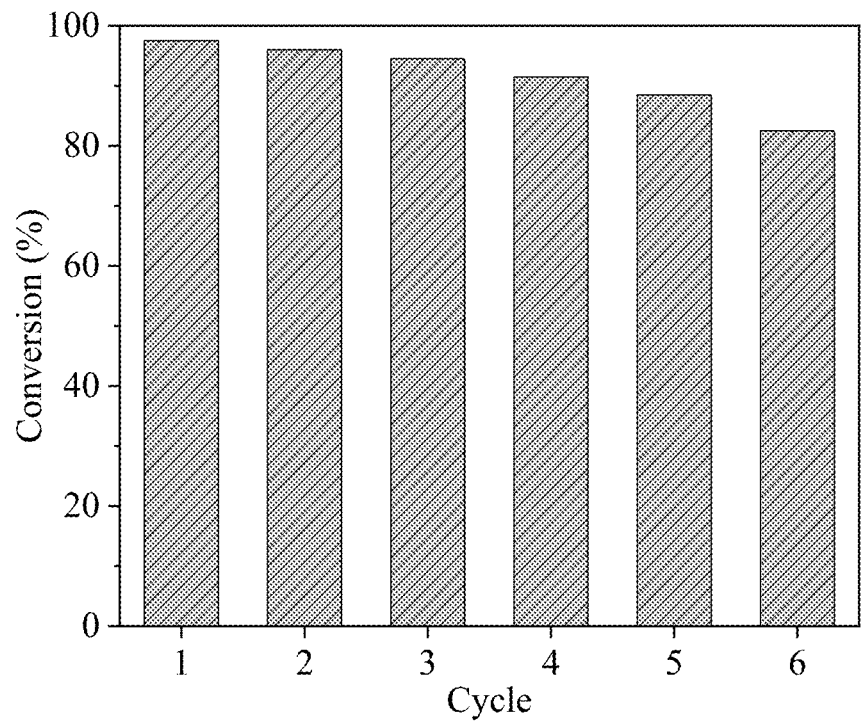
FIG. 1 is the interesterification repeatability test result showing embodiment 3 of in the present invention of Ca-800N.

In particular, the following detailed description is exemplary and intended to provide further explanation of the present invention. Unless otherwise specified, all technical and scientific terms used in this invention have the same meanings as commonly understood by ordinary technicians in the technical field to which this invention belongs.

Noted that the terminology used here is only for describing specific embodiments, and is not intended to limit exemplary embodiments according to the present invention.

As used herein, unless the context clearly indicates otherwise, the singular form is also intended to include the plural form. In addition, when the terms "comprising" and/or "comprising" are used in this specification, they indicate the presence of features, steps, operations, devices, components and/or combinations.

A preparation process of embedded alkaline earth metal oxide solid alkali comprises the following steps:

(1) The molar ratio of feedstock materials: metal source: trimesic acid ($H_3BTC$):$CH_3COOH$:$H_2O$ are 1:0.5:20:50-1:3:60:190. Firstly, the metal source is added into deionized water and ethanol and stirred for 10 min under the condition of constant temperature heating at 30° C. Then, $H_3BTC$ is added into the mixture and continuously heated and stirred for 30 min at 30° C. until the mixture is uniformly mixed;

(2) The mixture obtained in step (1) is placed in a teflon-lined stainless steel, crystallizing under the condition of 100-180° C. for 24h, and cooling to room temperature to obtain a solid product;

(3) Measure 50 mL of methanol to wash the solid obtained in step (2) at 30° C. for 1.5h, then centrifuge in a 6000 r/min centrifuge for 10 min to remove supernatant, and repeat the above steps twice to obtain the second washed solid;

(4) Measure 50 mL of deionized water to wash the second washed solid obtained in step (3) at 40° C. for 1h, then centrifuge in a 6000 r/min centrifuge for 10 min to remove supernatant, obtain the third washed solid;

(5) The third washed solid obtained in step (4) is dried at 120° C. for 10h under normal pressure to obtain solid powder, namely alkaline earth metal organic framework (M-BTC, where M represents alkaline earth metal).

(6) The M-BTC obtained in step (5) is heating from 20° C. to 600° C.-1200° C. according to the linear heating rate of 5° C./min with the non-oxidizing atmosphere flow rate to be 100 mL/min in tube furnace. Keeping the temperature for 2h and then naturally cooling to room temperature to obtain embedded double alkaline earth oxide solid alkali (M-XN, where M represents alkaline earth metal, X represents pyrolysis temperature, N represents non-oxidizing atmosphere)

The embedded alkaline earth metal oxide solid alkali obtained by the preparation process is used for catalyzing the transesterification reaction of feedstock oil and methanol to produce biodiesel, and the specific application method comprises the following steps of: The palm oil and methanol (the molar ratio of methanol/oil of 6:1-15:1) are added into the transesterification reactor with water-bath heating to 50° C.-70° C. And then, adding 6 wt. %-16 wt. % (the mass of feedstock oil) catalyst into reactor and stirred for 1.5h-3h. After the reaction, the catalyst was separated by centrifugally, and the obtained liquid was placed in a separatory funnel for standing and layering, the upper liquid is biodiesel, and the lower liquid is by-product glycerin.

In some embodiments, the metal source is single or multiple alkaline earth metals and is not limited to the type and amount of alkaline earth metals, and the molar ratio between the different alkaline earth metal sources can be adjusted depending on the specific organic ligand type.

In some embodiments, the metal source is alkaline earth metal salt, including, without limitation $Ca(CH_3COO)_2$, $Ca(NO_3)_2$, $CaCl_2$, $Mg(CH_3COO)_2$, $Mg(NO_3)_2$, $MgCl_2$, $Sr(CH_3COO)_2$, $Sr(NO_3)_2$, $SrCl_2$ et. al, to obtain an embedded alkaline earth metal oxide solid alkali with high catalytic performance.

In some embodiments, metal source: $H_3BTC$:$CH_3COOH$:$H_2O$ are 1:0.5:20:50-1:3:60:190, the constant temperature range is 20° C.-60° C., to speed up the solute dissolution rate.

In some embodiments, the hydrothermal crystallization condition is that the temperature is between 100° C.-180° C., the heating is continuously carried out for 20h-30h to form an alkaline earth metal organic framework through self-assembly in the adopted hydrothermal reaction process, naturally cooled to the room temperature after the reaction.

In some embodiments, the solid obtained in step (3) is washed with methanol, and the washing conditions are that the solid is heated in a water bath at 20° C.-50° C. and stirred for 0.5h-3h, and then the solid is separated by centrifugation, repeat the above steps twice.

In some embodiments, in step (5), the solid obtained in step (4) is washed with $H_2O$, and the washing conditions are that the solid is heated in a water bath at 20° C.-50° C. and stirred for 1h-3h, to remove impurities remaining on the alkaline earth metal organic framework.

In some embodiments, in step (6), the solid obtained in step (5) is dried at atmospheric pressure for 8h-15h at 80° C.-15° C., to solvent remaining on the surface of the alkaline earth metal organic framework is evaporated.

In some embodiments, the type and flow rate of the non-oxidizing atmosphere are not limited, and the pyrolysis process can be ensured to be a non-oxidizing atmosphere. The temperature is increased from 20° C. to 600° C.-1200° C. at a rate of 1° C./min-30° C./min and kept for 1h-5h and then naturally cooled to room temperature.

In some embodiments, embedded alkaline earth metal oxide solid alkali is used to catalyze transesterification of feedstock oil with methanol to produce biodiesel, and to catalyze feedstock oil with low acid value (<1.0 mgKOH/g), including, without limitation palm oil.

Then, the present invention will be further explained in detail with specific embodiment. It should be pointed out that the specific embodiment explains the present invention rather than limits it.

Embodiment 1

The preparation method of embedded alkaline earth metal oxide solid alkali includes the following steps:

(1) The molar ratio of feedstock materials: $Ca(CH_3COO)_2$:$H_3BTC$: $CH_3COOH$:$H_2O$ is 1:1:57:185. In detail, $Ca(CH_3COO)_2$ was added into $CH_3COOH$ and $H_2O$ and stirred for 10 min under the condition of constant temperature heating at 30° C. Subsequently, $H_3BTC$ was added into mixture and stirred for 30 min at 30° C. until the mixture is uniformly mixed. Finally, the mixture was placed in a teflon-lined stainless steel autoclave reactor at 120° C. for 24h, and cooling to room temperature to obtain a solid product.

(2) The solid obtained in step (1) was washed in 50 mL methanol with heating at 30° C. for 1.5h, then it was centrifuged for 10 min at 6000 r/min in a centrifuge, and repeat the above steps twice to obtain the second washed solid. Afterwards, second washed solid was further washed in 50 mL $H_2O$ with heating at 40° C. for 1h, then it was centrifuged for 10 min at 6000 r/min in a centrifuge to obtain the third washed solid.

(3) The third washed solid obtained in step (2) was dried at 120° C. for 10h under normal pressure to obtain MOFs Ca-BTC.

(4) The Ca-BTC obtained in step (3) was heating from 20° C. to 800° C. according to the linear heating rate of 5° C./min with the nitrogen flow rate to be 100 mL/min in tube furnace.

Keeping the temperature for 2h and then naturally cooling to room temperature to obtain embedded alkaline earth oxide solid alkali Ca-800N.

Embodiment 2

The preparation method of embedded double alkaline earth metal oxide solid alkali includes the following steps:

(1) The molar ratio of feedstock materials: $Ca(CH_3COO)_2$+$Mg(CH_3COO)_2$:$H_3BTC$: $CH_3COOH$:$H_2O$ is 1:1:28:58. In detail, $Ca(CH_3COO)_2$ and $Mg(CH_3COO)_2$ in a 1:1 molar ratio were added into $CH_3COOH$ and $H_2O$ and stirred for 10 min under the condition of constant temperature heating at 30° C. Subsequently, $H_3BTC$ was added into mixture and stirred for 30 min at 30° C. until the mixture is uniformly mixed. Finally, the mixture was placed in a teflon-lined stainless steel autoclave reactor at 150° C. for 24h, and cooling to room temperature to obtain a solid product.

(2) The solid obtained in step (1) was washed in 50 mL methanol with heating at 30° C. for 1.5h, then it was centrifuged for 10 min at 6000 r/min in a centrifuge, and repeat the above steps twice to obtain the second washed solid. Afterwards, second washed solid was further washed in 50 mL $H_2O$ with heating at 40° C. for 1h, then it was centrifuged for 10 min at 6000 r/min in a centrifuge to obtain the third washed solid.

(3) The third washed solid obtained in step (2) was dried at 120° C. for 10h under normal pressure to obtain MOFs CaMg-BTC.

(4) The CaMg-BTC obtained in step (3) was heating from 20° C. to 800° C. according to the linear heating rate of 5° C./min with the nitrogen flow rate to be 100 mL/min in tube furnace.

Keeping the temperature for 2h and then naturally cooling to room temperature to obtain embedded double alkaline earth oxide solid alkali CaMg-800N.

Embodiment 3

The preparation method of embedded double alkaline earth metal oxide solid alkali includes the following steps:

(1) The molar ratio of feedstock materials: $Ca(CH_3COO)_2$+$Sr(NO_3)_2$:$H_3BTC$:$CH_3COOH$:$H_2O$ is 1:1:28:58. In detail, $Ca(CH_3COO)_2$ and $Sr(NO_3)_2$ in a 1:1 molar ratio were added into $CH_3COOH$ and $H_2O$ and stirred for 10 min under the condition of constant temperature heating at 30° C. Subsequently, $H_3BTC$ was added into mixture and stirred for 30 min at 30° C. until the mixture is uniformly mixed. Finally, the mixture was placed in a teflon-lined stainless steel autoclave reactor at 150° C. for 24h, and cooling to room temperature to obtain a solid product.

(2) The solid obtained in step (1) was washed in 50 mL methanol with heating at 30° C. for 1.5h, then it was centrifuged for 10 min at 6000 r/min in a centrifuge, and repeat the above steps twice to obtain the second washed solid. Afterwards, second washed solid was further washed in 50 mL $H_2O$ with heating at 40° C. for 1h, then it was centrifuged for 10 min at 6000 r/min in a centrifuge to obtain the third washed solid.

(3) The third washed solid obtained in step (2) was dried at 120° C. for 10h under normal pressure to obtain MOFs CaSr-BTC.

(4) The CaSr-BTC obtained in step (3) was heating from 20° C. to 950° C. according to the linear heating rate of 5° C./min with the nitrogen flow rate to be 100 mL/min in tube furnace. Keeping the temperature for 2h and then naturally cooling to room temperature to obtain embedded double alkaline earth oxide solid alkali CaSr-950N.

Results and Discussion (1) The Ca-800N obtained in Embodiment 1 was used to catalyze the transesterification of feedstock oil with methanol: Typically, 5 g of palm oil (acid value of 0.25 mgKOH/g (GB/T5530-2005), saponification value of 209.67 mgKOH/g (GB/T5534-2008), molar mass of 803.63 g/mol) and methanol (2.37 g) were added with the molar ratio of methanol/oil of 12:1 in the transesterification reactor equipped with a condensing reflux unit. Then the mixture was stirred by magnetic force and water-bath heating to 65° C. After the reactant temperature was heated to 65° C., 0.4 g of catalyst (10 wt. % of the mass of feedstock oil) was added in the reactant and stirred for 2 h at 65° C. with condensing reflux. After the reaction, the catalyst was separated by centrifugally, and the obtained liquid was placed in a separatory funnel for standing and layering, the upper liquid is biodiesel, and the lower liquid is by-product glycerin. Ultimately, the biodiesel conversion was 97.50% measured by FTIR.

The Ca-800N obtained in embodiment 1 to 3 were used to catalyze the transesterification of feedstock oil with methanol, the transesterification conditions and biodiesel conversion are shown in Table 1.

characteristics of graded pores. The peaks appear at 5 nm and 8.69 nm, respectively, and the average pore size of 9.47 nm. The specific surface area and pore volume of Ca-800N were 310.36 m$^2$/g and 0.74 cm$^3$/g were measured by Brunauer-Emmett-Teller (BET) and Barrett-Joyner-Halenda (BJH). The surface area and pore volume of Ca-800N were much higher than the common CaO, therefore, more active sites can be exposed, and the transesterification reaction can be accelerated.

Figure 4:
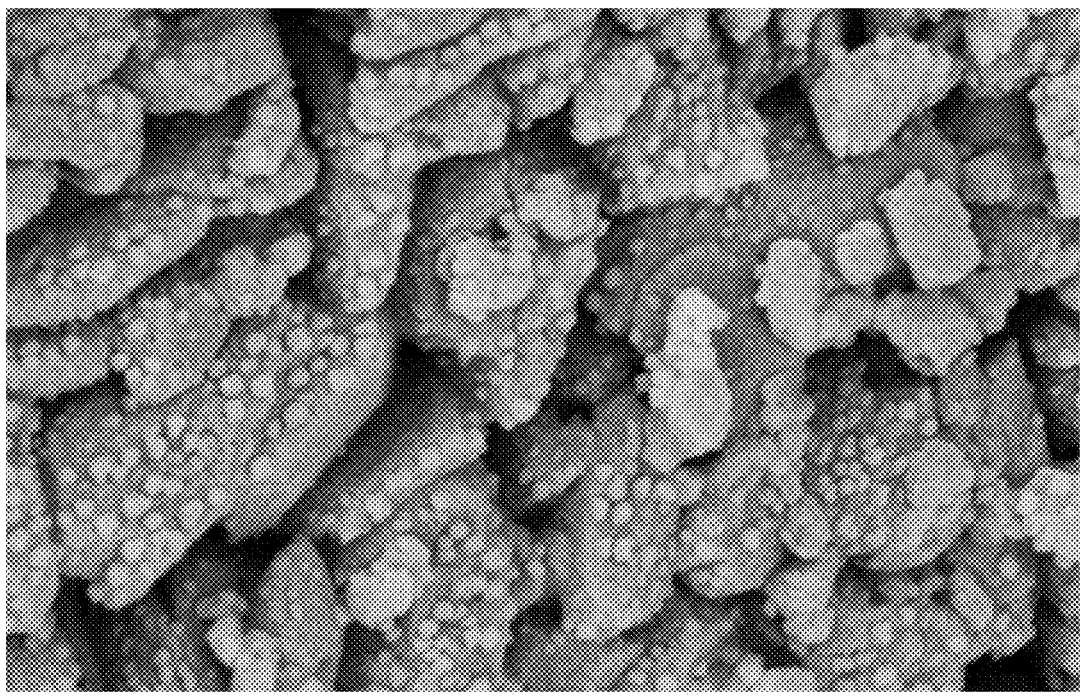
FIG. 4 is the SEM showing embodiment 3 in the present invention of Ca-800N.

(5) The micro-morphology of the Ca-800N of embodiment 1 was characterized by scanning electron microscopy (SEM). It can be seen from FIG. 4 that Ca-800N exhibits a lamellar structure and CaO-embedded particles on its surface. This indicates that the active site CaO are exposed and anchored on the carbon layer after pyrolysis, thus enhancing the stability of the catalyst. The nano-carbon-like sheets provide a huge specific surface area, and more active sites can be exposed.

Comparative Example 1

In embodiment 1 of Patent No. CN110052293A, the magnetic solid alkali prepared by using MIL-100(Fe) supported KF synthesized in a "two-step method" was found to have a conversion of 95.60% for catalyzing the transesterification of palm oil and methanol, which was lower than that in the present application. The result of that reusability test also indicate that the solid alkali obtained by the invention has better stability (FIG. 1).

TABLE 1

The transesterification conditions and biodiesel conversion in embodiment 1 to 3

| Embodiment | Catalyst | Molar ratio of methanol/oil | Catalyst amount (wt. %) | Reaction temperature (° C.) | Reaction time (h) | Conversion (%) |
| --- | --- | --- | --- | --- | --- | --- |
| 1 | Ca-800N | 12 | 8 | 65 | 2 | 97.50 |
| 2 | CaMg-800N | 12 | 15 | 65 | 3 | 97.40 |
| 3 | CaSr-950N | 12 | 8 | 65 | 2 | 94.00 |

(2) To evaluate the reusability of the embedded alkaline earth metal oxide solid alkali, the Ca-800N obtained in embodiment 1 was separated by centrifugation after each transesterification. With that, fresh palm oil and methanol are added immediately for the next cycle without any treatment. It can be seen from FIG. 1, the conversion obtained from Ca-800N decreased slowly from 97.50% to 82.50% during six cycles, which indicates that the embedded alkaline earth metal oxide solid alkali has strong stability.

Figure 2:
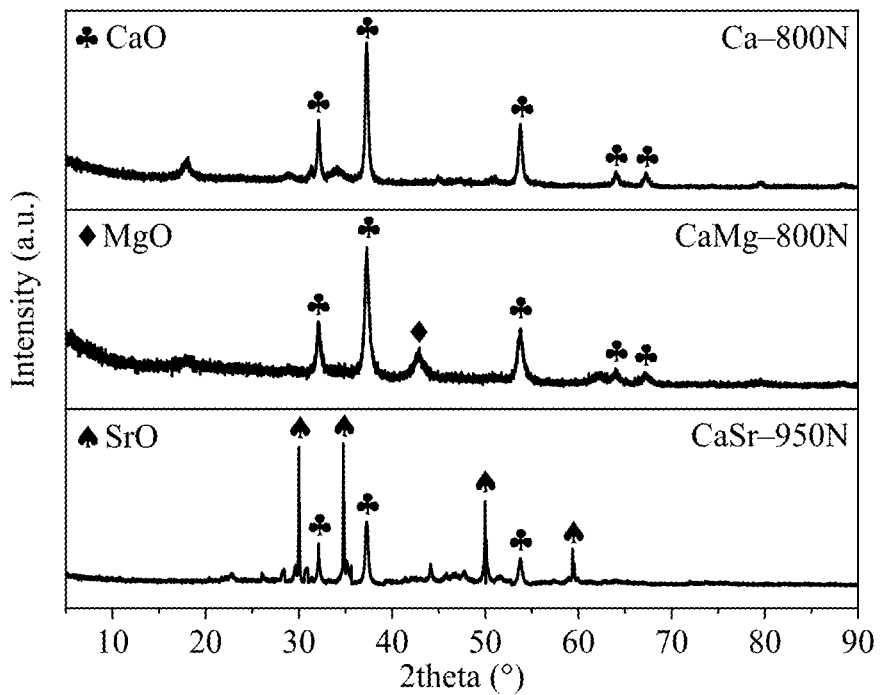
FIG. 2 is the XRD pattern showing embodiment 1 to 3 in the present invention of the embedded alkaline earth metal oxide solid alkali.

(3) The embedded alkaline earth metal oxide solid alkali obtained in embodiment 1 to 3 were characterized by X-ray diffractometer (XRD). It can be seen from FIG. 2, the embedded alkaline earth metal oxides solid alkali obtained in embodiment 1 to 3 were the corresponding alkaline earth metal oxides, which indicates that active sites had been generated after high temperature pyrolysis.

Figure 3:
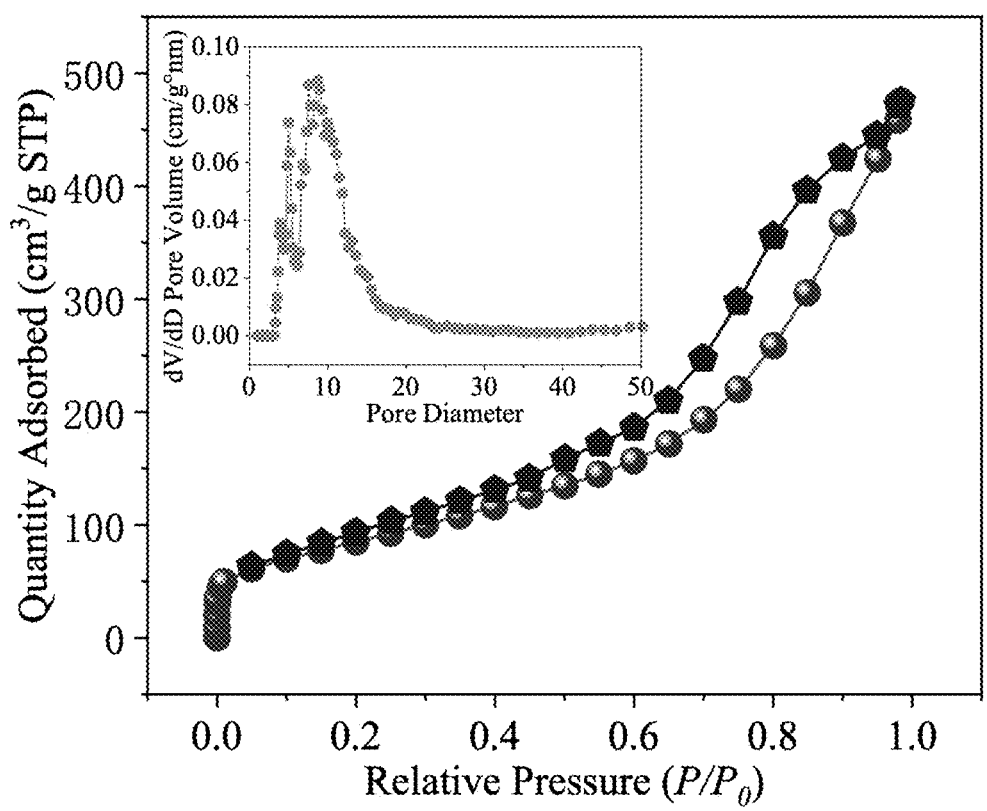
FIG. 3 is the $N_2$ isothermal adsorption-desorption and pore size distribution curve showing embodiment 3 in the present invention of Ca-800N.

(4) The pore structure and specific surface area of the Ca-800N in embodiment 1 was characterized by a N$_2$ adsorption and desorption apparatus. It can be seen from FIG. 3, based on the IUPAC classification, N$_2$ adsorption-desorption isotherm of Ca-800N was the type-II pattern with H$_2$ shaped hysteresis loop, this indicates the Ca-800N was a mesoporous material. It can be seen from the pore size distribution diagram in FIG. 3, the pore size of Ca-800N was distributed within the range of 5 nm-20 nm, and has the Ultimately, it should be noted that the above description is only the preferred embodiment of the present invention, and is not used to limit the present invention. Although the present invention has been described in detail with the foregoing embodiments, those in the field can still modify the technical solutions described in the foregoing embodiments, or replace some of them equivalently. Any modification, equivalent replacement, improvement, etc. made within the spirit and principle of the present invention should be included in the scope of protection of the present invention. Although the specific embodiments of the present invention have been described above, it is not a limitation on the scope of protection of the present invention. Therefore, the technicians in the field should understand: On the basis of the technical scheme of the invention, various modifications or deformations that can be made by technicians in the field without creative labor are still within the scope of protection of the invention.

The invention claimed is:

1. A preparation method of an embedded alkaline earth metal oxide solid alkali, comprising:
uniformly mixing a metal source and trimesic acid (H$_3$BTC) in CH$_3$COOH and H$_2$O, crystallizing, and cooling to obtain a solid product, washing the solid product a plurality of times and drying to obtain an alkaline earth metal organic framework; and pyrolyzing the alkaline earth metal organic framework in a non-oxidizing atmosphere to form the embedded alkaline earth metal oxide solid alkali,
wherein the metal source is selected from the group consisting of $Ca(CH_3COO)_2$, $Ca(NO_3)_2$, $CaCl_2$, $Mg(CH_3COO)_2$, $Mg(NO_3)_2$, $MgCl_2$, $Sr(CH_3COO)_2$, $Sr(NO_3)_2$, and $SrCl_2$.

2. The preparation method of the embedded alkaline earth metal oxide solid alkali according to claim 1, wherein the pyrolyzing comprises: heating at a heating rate of 1° C./min to 30° C./min, increasing a reaction temperature from 20° C. to a temperature between 600° C. and 1200° C., and keeping the reaction temperature for 1 to 5 hours.

3. The preparation method of the embedded alkaline earth metal oxide solid alkali according to claim 1, wherein a molar ratio of the metal source, $H_3BTC$, $CH_3COOH$ and $H_2O$ is from 1:0.5:20:50 to 1:3:60:190.

4. The preparation method of the embedded alkaline earth metal oxide solid alkali according to claim 1, wherein the crystallizing is conducting at 100° C.- 180°C for 20 to 30 hours.

5. The preparation method of the embedded alkaline earth metal oxide solid alkali according to claim 1, wherein the washing comprises: washing the solid product in 50 mL methanol with heating at 20° C.-50° C. for 0.5 to 3 hours, repeating washing in methanol twice, and centrifuging for 10 min at 6000 r/min in a centrifuge to obtain a washed solid product;
washing the washed solid product in 50 mL $H_2O$ with heating at 20° C. -50° C. for 1 to 3 hours, and centrifuging for 10 min at 6000 r/min in a centrifuge to obtain the alkaline earth metal organic framework.

* * * * *